(12) United States Patent
Dhanakshirur et al.

(10) Patent No.: US 8,386,248 B2
(45) Date of Patent: Feb. 26, 2013

(54) TUNING REUSABLE SOFTWARE COMPONENTS IN A SPEECH APPLICATION

(75) Inventors: Girish Dhanakshirur, Delray Beach, FL (US); Baiju D. Mandalia, Boca Raton, FL (US); Aimee Silva, Miramar, FL (US)

(73) Assignee: Nuance Communications, Inc., Burlington, MA (US)

( * ) Notice: Subject to any disclaimer, the term of this patent is extended or adjusted under 35 U.S.C. 154(b) by 1044 days.

(21) Appl. No.: 11/534,320

(22) Filed: Sep. 22, 2006

(65) Prior Publication Data

US 2008/0077402 A1 Mar. 27, 2008

(51) Int. Cl.
- G10L 15/06 (2006.01)
- G10L 11/00 (2006.01)
- G10L 21/00 (2006.01)

(52) U.S. Cl. ......... 704/243; 704/244; 704/270; 704/275

(58) Field of Classification Search .................. 704/243, 704/244, 270, 275
See application file for complete search history.

(56) References Cited

U.S. PATENT DOCUMENTS

| | | | | |
|---|---|---|---|---|
| 4,167,653 A | * | 9/1979 | Araseki et al. | 704/233 |
| 5,251,131 A | * | 10/1993 | Masand et al. | 704/9 |
| 5,418,717 A | * | 5/1995 | Su et al. | 704/9 |
| 5,625,687 A | * | 4/1997 | Sayre, III | 379/416 |
| 5,835,890 A | * | 11/1998 | Matsui et al. | 704/255 |
| 5,860,059 A | * | 1/1999 | Aust et al. | 704/231 |
| 6,101,241 A | * | 8/2000 | Boyce et al. | 379/88.01 |
| 6,324,513 B1 | * | 11/2001 | Nagai et al. | 704/275 |
| 6,381,568 B1 | * | 4/2002 | Supplee et al. | 704/210 |
| 6,385,304 B1 | * | 5/2002 | Hunt et al. | 379/88.01 |
| 6,389,395 B1 | * | 5/2002 | Ringland | 704/254 |
| 6,405,170 B1 | | 6/2002 | Phillips et al. | |
| 6,513,037 B1 | * | 1/2003 | Ruber et al. | 1/1 |
| 6,519,561 B1 | * | 2/2003 | Farrell et al. | 704/232 |
| 6,571,210 B2 | * | 5/2003 | Hon et al. | 704/251 |
| 6,789,062 B1 | | 9/2004 | Phillips et al. | |
| 6,847,930 B2 | * | 1/2005 | Allen et al. | 704/233 |
| 6,950,796 B2 | * | 9/2005 | Ma et al. | 704/244 |
| 6,963,834 B2 | | 11/2005 | Hartley et al. | |
| 6,983,244 B2 | * | 1/2006 | Junqua et al. | 704/231 |
| 6,985,862 B2 | * | 1/2006 | Strom et al. | 704/255 |
| 6,996,531 B2 | * | 2/2006 | Korall et al. | 704/270 |
| 6,999,926 B2 | * | 2/2006 | Yuk et al. | 704/244 |

(Continued)

FOREIGN PATENT DOCUMENTS

JP 2005099825 4/2005

OTHER PUBLICATIONS

Ganapathiraju et al., "Comparison of Energy-Based Endpoint Detectors for Speech Signal Processing", IEEE, vol. 721, pp. 500-503 (1996).

(Continued)

*Primary Examiner* — Eric Yen
(74) *Attorney, Agent, or Firm* — Wolf, Greenfield & Sacks, P.C.

(57) ABSTRACT

A method of tuning reusable dialog components within a speech application can include detecting speech recognition events generated from a plurality of recognitions performed for a field of a reusable dialog component. The speech recognition events can be generated over a plurality of interactive voice response sessions. The method also can include automatically computing a suggested value for a tuning parameter corresponding to the field of the reusable dialog component according, at least in part, to the speech recognition events.

18 Claims, 3 Drawing Sheets

| RDC 205 | |
|---|---|
| Field 1 | P1, P2 |
| Field 2 | P1, P2 |
| Field 3 | P1, P2 |

| Model 140 | | | |
|---|---|---|---|
| RDC | RDC Instantiations | Fields | Suggested Tunable Parameter Values |
| RDC 1 | RDC 1 Counter | Field 1 | P1, P2 |
| | | Field 2 | P1, P2 |
| | | Field 3 | P1, P2 |
| RDC 2 | RDC 2 Counter | Field 1 | P1, P2 |
| | | Field 2 | P1, P2 |
| | | Field 3 | P1, P2 |
| RDC 3 | RDC 3 Counter | Field 1 | P1, P2 |
| | | Field 2 | P1, P2 |
| | | Field 3 | P1, P2 |
| | | ○ ○ ○ | |

U.S. PATENT DOCUMENTS

| | | | |
|---|---|---|---|
| 7,003,459 B1 * | 2/2006 | Gorin et al. | 704/240 |
| 7,024,366 B1 * | 4/2006 | Deyoe et al. | 704/270.1 |
| 7,043,435 B2 * | 5/2006 | Knott et al. | 704/270 |
| 7,050,974 B1 * | 5/2006 | Komori et al. | 704/256 |
| 7,133,828 B2 * | 11/2006 | Scarano et al. | 704/251 |
| 7,483,833 B2 * | 1/2009 | Peters | 704/270 |
| 7,613,610 B1 * | 11/2009 | Zimmerman et al. | 704/235 |
| 7,788,103 B2 * | 8/2010 | Marcus | 704/275 |
| 7,827,032 B2 * | 11/2010 | Braho et al. | 704/251 |
| 7,966,218 B1 * | 6/2011 | Fish | 705/14.68 |
| 8,005,668 B2 * | 8/2011 | Arun | 704/226 |
| 2002/0116190 A1 * | 8/2002 | Rockenbeck et al. | 704/250 |
| 2002/0188451 A1 | 12/2002 | Guerra et al. | |
| 2002/0198719 A1 | 12/2002 | Gergic et al. | |
| 2003/0130841 A1 | 7/2003 | Bangalore et al. | |
| 2004/0085162 A1 | 5/2004 | Agarwal et al. | |
| 2005/0216266 A1 * | 9/2005 | Gong et al. | 704/256 |

OTHER PUBLICATIONS

Akolkar et al., "Reusable Dialog Component Framework for Rapid Voice Application Development", Lecture Notes in Computer Science, vol. 3489, pp. 306-321 (2005).

* cited by examiner

TUNING REUSABLE SOFTWARE COMPONENTS IN A SPEECH APPLICATION

BACKGROUND OF THE INVENTION

Interactive Voice Response (IVR) systems enable a user to interact with various applications and/or systems using a combination of voice and touch-tone responses. In general, an IVR system can include a speech recognition system, a text-to-speech system, and a speech application. The speech application generally dictates the order and circumstances in which dialogs are presented to the user. The complexity of modern speech applications has led to the development of reusable software components. Reusable software components facilitate the development of speech applications by shielding developers from the intricacies associated with building a robust speech dialogue, e.g., confidence score interpretation, error recovery mechanisms, prompting, and the like.

One type of reusable software component for use in constructing a speech application is defined by the Reusable Dialog Component (RDC) framework. The RDC framework specifies how Java Server Page taglibs that aid in rapid development of voice and multimodal applications can be created. An RDC is composed of a data model, speech-specific assets like grammars and prompts, configuration files, and the dialog logic needed to collect one or more items of information from a user. The voice user interface can be implemented using a voice markup language such as Voice Extensible Markup Language (VoiceXML) which is generated by the RDC. Speech applications can be written by instantiating one or more RDCs. The runtime behavior of the RDCs can be regulated by specifying various tuning parameters and configuration files. Through the RDC tuning parameters and configuration files, for example, one can customize the RDC with respect to vocabulary, retry settings, specify application-specific prompts, and the like.

RDCs encapsulate well-tried elements of speech user interface design. An RDC, for example, can collect information such as an address from the user. In doing so, the RDC ensures that all the required interactions for guaranteeing the completeness, such as validity and canonicalization format, of the data are provided. An address RDC, for example, would provide the error handling and logic needed for obtaining all aspects of a user address such as the street address, apartment number, city, state, and zip code. Each item of information that is collected by the RDC fills in a field of the RDC. Thus, an address RDC would have multiple fields in which the different data items comprising the address would be filled. In any event, when writing another speech application that must receive a user address, the address RDC simply can be incorporated into that application rather than coding a solution for capturing a user address from scratch.

As noted, RDC components can be tuned prior to being deployed as part of a speech application. The tunable parameters for each RDC allow the RDC to behave very differently according to the particular environment in which the speech application will be used. Accordingly, it is necessary to tune these parameters so that the speech application will function in an acceptable manner when placed in a given environment.

Presently, speech applications are tuned by deploying the IVR system and speech application in a pilot phase where data is collected in a log over a period of days or weeks. The log is manually reviewed using various software-based analysis tools. From this review, one or more values for the different tunable parameters of the RDCs used in the speech application can be determined. The speech application can be deployed again with the RDCs being updated to include the newly determined values for the different tunable parameters. This process is often repeated until such time that the speech application performs in an acceptable manner. In certain circumstances, the above process may have to be repeated even when an application that had been functioning properly begins to experience degraded performance due to changes relating to demography of callers, hardware changes, etc.

The manual and repetitive nature of the tuning process is cumbersome and labor intensive, often requiring significant time to properly tune or adjust the speech application. It would be beneficial to provide a technique for tuning reusable software components that addresses the limitations described above.

BRIEF SUMMARY OF THE INVENTION

The present invention provides method(s) and apparatus relating to the tuning of reusable software components within a speech application. One embodiment of the present invention can include a method of tuning reusable dialog components (RDCs) within a speech application. The method can include detecting speech recognition events generated from a plurality of recognitions performed for a field of an RDC, wherein the speech recognition events are generated over a plurality of interactive voice response (IVR) sessions. The method also can include automatically computing a suggested value for a tuning parameter corresponding to the field of the RDC according, at least in part, to the speech recognition events.

Another embodiment of the present invention can include a system for tuning RDCs of a speech application. The system can include one or more RDCs, wherein the RDC includes at least one tunable parameter, and a listener configured to detect speech recognition events generated during execution of the RDC. The speech recognition events can have a specific type and can be associated with a particular field of the RDC. The system further can include a model including estimated tuning parameter information for the RDC. The listener can calculate a suggested value for a tuning parameter of the particular field of the RDC according, at least in part, to the detected speech recognition events and store the suggested value within the model.

Yet another embodiment of the present invention can include a machine readable storage being programmed to cause a machine to perform the various steps and/or functions described herein.

DETAILED DESCRIPTION OF THE INVENTION

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module", or "system". Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The embodiments disclosed herein relate to the tuning of reusable software components for use in constructing speech applications. In accordance with the inventive arrangements, a framework for reusable software components can be extended so that information relating to different events can be captured and evaluated. This information can be used automatically to determine proper values for use in tuning one or more tunable parameters of the reusable software components. The reusable software components can be initialized using these values to dynamically tune the component. These and other aspects of the present invention will be presented and discussed in further detail in combination with the figures.

Figure 1:
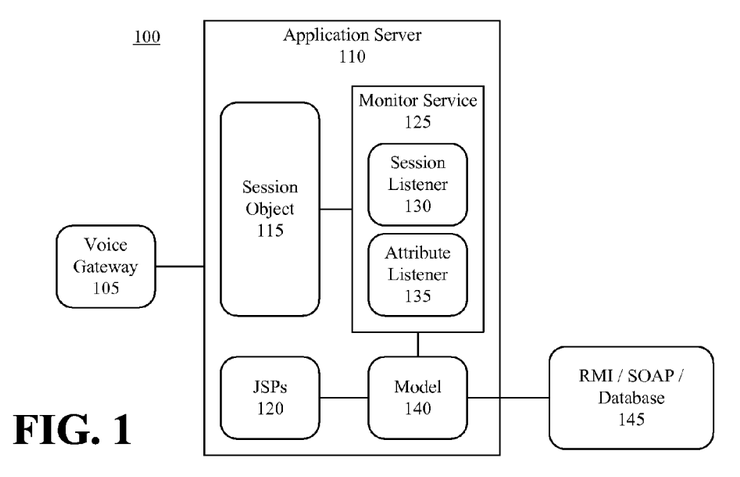
FIG. 1 is a block diagram illustrating a system for use in tuning reusable software components in accordance with one embodiment of the present invention.

FIG. 1 is a block diagram illustrating a system 100 for use in tuning reusable software components in accordance with one embodiment of the present invention. For purposes of illustration, the system 100 is described with reference to the Reusable Dialog Component (RDC) framework. It should be appreciated, however, that reference to the RDC framework is not intended as a limitation of the present invention. Rather, the embodiments disclosed herein can be applied to any of a variety of different frameworks which support reusable software components for use in constructing speech applications.

As shown, the system 100 can include a voice gateway 105 and an application server 110. The voice gateway 105 provides the functions needed to answer and route telephone calls including, but not limited to providing call control functionality and implementing speech processing functions such as speech synthesis, or playback, and speech recognition. In one embodiment, the voice gateway 105 can be implemented as a Voice Extensible Markup Language (VoiceXML) gateway and include a voice browser, a speech recognition engine (SRE), as well as a text-to-speech engine. In another embodiment, the voice gateway 105 can be implemented as a Speech Application Language Tags (SALT) gateway and include a SALT browser interpreting SALT forms.

The application server 110 can provide a container environment in which various software components, to be described herein in further detail, can execute. In one embodiment, the application server 105 can be implemented as WebSphere Application Server as is commercially available from International Business Machines Corporation of Armonk, N.Y. It should be appreciated, however, that other application servers also can be used and that reference to any particular application server or Web container is for purposes of illustration only and should not be viewed as a limitation of the present invention.

The application server 110 can include a session object 115, one or more Java Server Pages (JSPs) 120, a monitor service 125, and a model 140. The session object 115 can be created for a current call, which also can be referred to as a session. The session object 115 can save the different states and state information corresponding to the various RDCs that are executed or instantiated during the session. The session object 115 is destroyed when the current session, or call, terminates.

The JSPs 120 host the RDCs used to implement the voice application. As noted, each RDC can include one or more tunable parameters which determine the behavior of that RDC. The tunable parameters can be specified on a field by field basis for each RDC. In illustration, an RDC configured to collect a user address information can have multiple fields for collecting items of information such as a street address, city, state, zip code, etc. which together specify an address. Each of these respective fields of the address RDC can include one or more tunable parameters.

For example, each field can have a tunable confidence score which functions as a threshold. This tunable parameter can indicate the minimally acceptable confidence score associated with a recognition result returned from the SRE for filling a particular field of the RDC. If the SRE performs a recognition operation for filling a particular field, and returns a confidence score below the minimal confidence score, as indicated by the tunable parameter for the field, the address RDC can cause the voice gateway 105 to continually re-prompt the user and process any newly received user speech in answer to the re-prompting until such time that the SRE returns a recognition result having a confidence score that exceeds the threshold value set by the tunable parameter.

The monitor service 125 can register with the application server 110 to receive notifications relating to events including, but not limited to, servlet initialization, attribute instantiations, attribute updating, servlet termination, and the like. As shown, the monitor service 125 can include a session listener 130 and an attribute listener 135. The session listener 130 monitors for the instantiation of one or more selected RDCs. The attribute listener 135 monitors for the occurrence of one or more different speech events as are generated by the SRE of the voice gateway 105.

Data identified and/or generated by the session listener 130 or the attribute listener 135 of the monitor service 125 can be stored, in one form or another, within the model 140. In one embodiment, the model 140 can be implemented as an MBean. The model 140 can include values corresponding to the various tunable parameters of the RDCs available for use within the application server 110 and as specified by the JSPs 120. In one embodiment, the model 140 can include different values for tunable parameters of one or more different RDC's. The values for tunable parameters of RDCs further can be stored for individual fields of each respective RDC for which such data is maintained.

The system 100 further can include one or more real-time connection objects which allow developers to view or observe the model 140 in real-time as it evolves. In one embodiment, a Remote Method Invocation object 145 or Simple Object Access Protocol (SOAP) object 145 can be included to facilitate real-time access to the model 140. In another embodiment, the model 140, or the individual data items used to calculate the suggested values of tunable parameters in the model 140, can be persisted to a database 145.

In operation, a call can be answered by the voice gateway 105. Based upon various factors, such as the called number, a JSP 120 can be selected. Typically, a called number is mapped to a particular Universal Resource Locator (URL), which corresponds to the selected JSP 120. If not already compiled, the selected JSP 120 is compiled into a servlet. The "init" method of the selected JSP 120 is called, which triggers a notification of an RDC initialization event to be sent by the application server 110 to the monitor service 125. The RDCs specified by the selected JSP 120 are instantiated. Once instantiated, an RDC can dynamically generate VoiceXML, which is provided to the voice gateway 105 for execution.

The session object 115, which is created for the current call, can save the different states and state information corresponding to the various RDCs that are executed or instantiated during the session. The monitor service 125 receives the notification sent by calling the "init" method. The session listener 130, as noted, can monitor for the instantiation of one or more RDCs. Thus, each time an RDC is instantiated, the session listener 130 can identify such an occurrence and update tracking information stored within the model 140. In one embodiment, the session listener 130 can be configured to count the number of times each RDC is instantiated on a call by call basis. In another embodiment, the session listener 130 can be configured to detect and count instantiations of only selected RDCs. In any case, this information can be stored by the session listener 130 within the model 140.

The attribute listener 135 can monitor for one or more speech events relating to speech processing operations that are performed to fill one or more fields of the RDCs. In illustration, each time a speech recognition operation is performed, one or more speech events can be returned from the voice gateway 105 to the application server 110. Such events relate to various conditions concerning the recognition operation. For example, if a user utters a phrase that is not in the active grammar of the speech recognition engine (SRE), a "no match" speech event can be returned. If the SRE is unable to convert the user spoken utterance to text, the SRE can generate a speech event indicating that the user spoken utterance was not understood. Another example can be where the SRE does not detect any user spoken utterance, in which case a speech event indicating that no input was received is generated. Yet another example of a speech event can be one that indicates the confidence score of a particular recognition result.

In illustration, consider the case in which an RDC, i.e., a call director RDC, has a component to capture one of the menu items from a list of menu items in the main menu. The menu items can include, for example, "Customer Support", "Employee Directory", "Technical Support", or "Billing". When the RDC is instantiated during the "init" method, an attribute variable can be created on the session object 115. The attribute variable can have an acceptable recognition value of 0-1.0 along with other RDC values.

On first turn, the RDC can send VoiceXML to create this form. The VoiceXML browser can, in turn, send the grammar with the above options to the SRE and tell the SRE to start recognition. The user can say one of the options such as "Billing". The SRE may determine that the confidence score is 0.3 for the "billing" result. The VoiceXML browser can post a result such as 'reco_utt="billing", conf_score="3", grammar="Main Menu"' to the JSP 120 that is hosting the RDC. The RDC can read the confidence score of 0.3 and update the attribute with the recognized result value of 0.3.

This action can trigger the listener since the listener is monitoring any changes to attribute updates on the session object 115. The listener can pass the updated value of 0.3 along with the attribute name that was changed. The model 140 can save this value and increment the counter to determine and save the number of times this attribute received this value. If the RDC was configured not to accept anything less than 0.5, the RDC will trigger a reprompt by sending reprompt VoiceXML to the VoiceXML browser.

In situations where the majority of the time the speech recognition result has a confidence score between 0.3 and 0.35, i.e., >10,000 calls, the value can be updated in the attribute via the listener. The RDC can automatically change the present value to use 0.3 as the default value in place of 0.5, thereby avoiding unnecessary reprompts and providing improved user satisfaction.

The attribute listener 135 can monitor for the occurrence of particular speech events for selected RDCs and store such events. Further, since speech events are generated on a field by field basis, the speech events can be monitored and/or detected for selected fields of selected RDCs. In any case, this information can be stored within the model 140 and further processed as will be described herein in greater detail.

In addition to storing historical information regarding speech events and RDC instantiation events, the listeners 130 and 135 can perform various statistical processing techniques and/or apply one or more predetermined rules to the data. In one embodiment, for example, the attribute listener 135 can keep a running average of the values of particular events returned by the SRE. Such processing techniques can be applied on an RDC by RDC basis and further on a field by field basis for selected RDCs.

In illustration, if an address RDC is instantiated, the session listener 130 can create a counter if none exists within the model 140 or increment a counter for the address RDC within the model 140 if such a counter does exist. A running total indicating the number of times the address RDC was instantiated can be maintained by the session listener 130 and updated within the model 140. As the address RDC continues to execute, speech events are generated by the SRE. The attribute listener 135 can detect such events.

More particularly, as speech is processed to fill different fields of the address RDC, the attribute listener 135 can detect the speech events generated for the fields. For example, the attribute listener can be configured to monitor for all confidence score related speech events for the address RDC for one or more fields of the address RDC, i.e., the zip code field. In that case, the attribute listener 135 can keep a running average of the last "N" confidence score values for the zip code field of the address RDC. This information can be used to set a tunable parameter of the address RDC. Thus, for example, the value of the tunable parameter relating to the minimally acceptable confidence score for a recognition result for the zip code field of the address RDC can be set to the result obtained from statistically processing this data.

It should be appreciated that the listeners 130 and 135 can apply any of a variety of different statistical processing techniques to the data. The use of averaging is used for purposes of illustration only and is not intended to limit the present invention. Other statistical processing techniques can be used if so desired. Further, it should be appreciated that such techniques can be used in tracking any type of SRE event for any selected field of an RDC or any RDC instantiation event.

The model 140 maintains suggested values for various tunable parameters of the RDCs used within the application server 105. In one embodiment, where a database 145 is connected to the model 140, information generated by the listeners 130 and 135 also can be stored within the database 145. This allows historical information to be retained, particularly in the event where the model 140 may only reflect a limited set of the historical data, e.g., the last "N" values of a given speech event. Also, the last "N" values of a particular, suggested tunable parameter as determined by the attribute listener 135 can be stored within the database 145.

In illustration, a speech application that is deployed in a noisy environment such as an airport can be automatically tuned. Data relating to confidence scores, no input events, "no-match" events, and the like can be averaged or statistically processed to determine values to be used in setting the tunable parameters of the RDCs. Thus, if the speech application is to be deployed in a similar environment in the future, the same or similar values for the different tunable parameters of the RDCs can be used.

Figure 2:
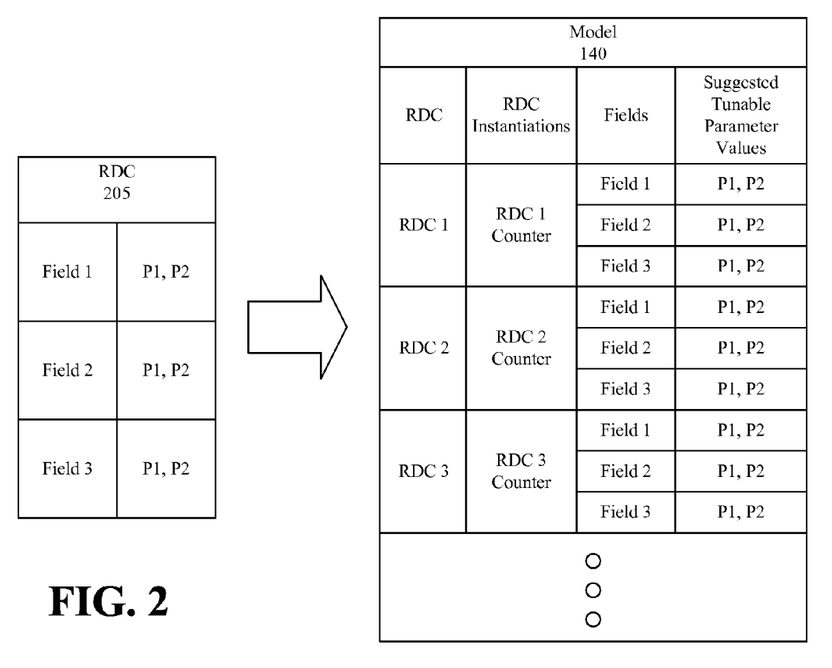
FIG. 2 is a block diagram which is useful for understanding the embodiments disclosed herein.

FIG. 2 is a block diagram which is useful for understanding the embodiments disclosed herein. FIG. 2 depicts an RDC 205 having three fillable fields labeled field 1, field 2, and field 3. Each field of RDC 205 is associated with two tunable parameters P1 and P2. The model 140 includes data corresponding to historical data generated in the course, for example, of a pilot run of an IVR system as RDCs are instantiated and executed.

In this regard, the model 140 can include a listing of the RDCs that have been instantiated and a counter for each RDC indicating the number of times that RDC has been instantiated. As noted, the session listener can detect instantiations of RDCs and maintain the count information within the model 140. Suggested values for the various tunable parameters of each field of the RDCs also can be maintained within the model 140. The attribute listener can detect particular speech events for the different fields of an RDC and process that information, storing the result within the model 140. For example, the attribute listener can maintain the last "N" values for a particular type of speech event detected for field 1 of RDC 1. As each new value is detected, the attribute listener can re-compute a running average of the last "N" values and store the result within the model 140, i.e., as P1.

In one embodiment, such data can be collected for each RDC and for each field. In another embodiment, the session listener can be configured to respond to instantiations of only selected RDCs. In another embodiment, the attribute listener can be configured to respond to only particular types of speech events generated for selected fields of selected RDCs.

Figure 3:
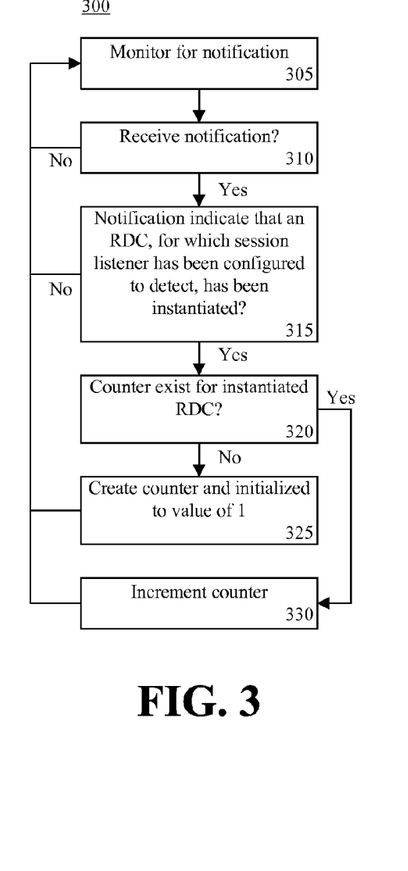
FIG. 3 is a flow chart illustrating a method of tuning reusable software components in accordance with another embodiment of the present invention.

FIG. 3 is a flow chart illustrating a method 300 of tuning reusable software components for use with speech applications in accordance with another embodiment of the present invention. The method 300 can be implemented using a system as described with reference to FIG. 1 and begin in step 305 where a session is established between a user, the voice gateway, and the application server. Accordingly, the monitor service can begin monitoring for notifications of RDC instantiation events. In step 310, a determination can be made as to whether a notification has been received. If so, the method can proceed to step 315. If not, the method can loop back to step 305.

Continuing with step 315, a further determination can be made as to whether the notification indicates that an RDC, for which the session listener has been configured to detect, has been instantiated. The session listener can be configured to monitor and respond to instantiation events for one or more selected RDCs. For example, the session listener can be configured to detect the instantiation of only an address RDC or a name RDC, but not a telephone number RDC. Upon receiving a notification in the monitoring service, the session listener can determine, from the notification, the type of RDC that was instantiated and whether that particular RDC is one that the session listener has been configured to monitor. If the notification indicates an RDC for which the session listener has been configured to monitor, the method can proceed to step 320. If not, the method can loop back to step 305 and continue monitoring for further notifications.

In step 320, a determination can be made as to whether a counter exists for the identified RDC. Each different RDC for which the session listener is configured to monitor can be associated with, or have, its own counter for counting the number of times that RDC has been instantiated over a given period of time, i.e., during a pilot run of the IVR system. If a counter does exist for the identified RDC, the method can continue to step 330 where that counter can be incremented. If no counter exists for the identified RDC, the method can proceed to step 325 where a counter can be created and initialized to a value of 1. The method 300 can repeat as may be required during a pilot run of an IVR system and/or speech application.

Figure 4:
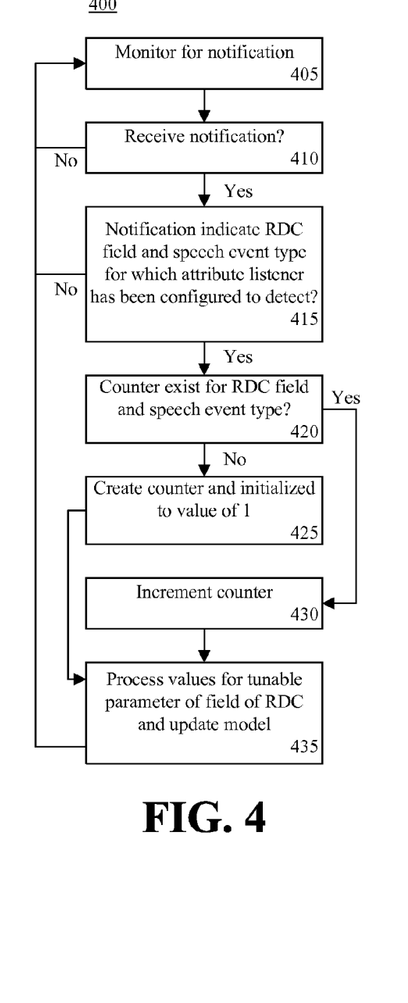
FIG. 4 is a flow chart illustrating a method of tuning reusable software components in accordance with another embodiment of the present invention.

FIG. 4 is a flow chart illustrating a method 400 of tuning reusable software components for use with speech applications in accordance with another embodiment of the present invention. The method 400 can be implemented using a system as described with reference to FIG. 1 and begin in step 405 where a session is established between a user, the voice gateway, and the application server. In one embodiment, the method 400 can be performed concurrently, or in parallel, with the method 300 described with reference to FIG. 3. In step 405, the monitor service can begin monitoring for notifications. In step 410, a determination can be made as to whether a notification has been received. If so, the method can proceed to step 415. If not, the method can loop back to step 405.

Continuing with step 415, a further determination can be made as to whether the notification indicates a speech event for a field and an RDC for which the attribute listener has been configured to detect, as well as a speech event type that the RDC has been configured to detect. As noted, the attribute listener can be configured to monitor and detect particular speech event types that correspond to selected fields of selected RDCs. For example, the attribute listener can be configured to detect speech events specifying confidence scores for a zip code field of an address RDC. In that case, the attribute listener would respond only to speech recognition events indicating the confidence score of a speech recognition operation performed for filling the zip code field of the address RDC. The attribute listener can be configured to monitor for a variety of speech event types for one or more, or all, fields of one or more, or all, RDCs. If the notification indicates a speech event type for a particular field of an RDC for which the attribute listener has been configured to monitor, the method can proceed to step 420. If not, the method can loop back to step 405.

In step 420, a determination can be made as to whether a counter exists for the identified event type and the field of the RDC. Counters can be maintained on a field by field basis as well as on an RDC by RDC basis. Moreover, each field can have one counter for each speech event type that is to be counted or tracked. Accordingly, the number of times a particular speech event is generated in relation to a specific field of a designated RDC can be counted. If a counter does exist for the identified speech event type/RDC field, the method can continue to step 430 where that counter can be incremented. If no counter exists for the identified speech event type/RDC field combination, the method can proceed to step 425 where a counter can be created and initialized to a value of 1.

Continuing with step 435, the attribute listener can process the values of speech events collected for the selected field of the RDC. As noted, the attribute listener can maintain a plurality of such values, for example the last "N" values, all such values generated over a predetermined time period, etc. The attribute listener then can apply a statistical processing technique to the values and store the result within the model as a suggested value for the tunable parameter for the field of the RDC. It should be appreciated that while the embodiments disclosed herein have been illustrated with a single speech event type being used to determine a tunable parameter of an RDC, the present invention is not so limited. Values of one or more different event types corresponding to a given field can be statistically processed to calculate a suggested value for a tunable parameter that can be stored within the model.

Figure 5:
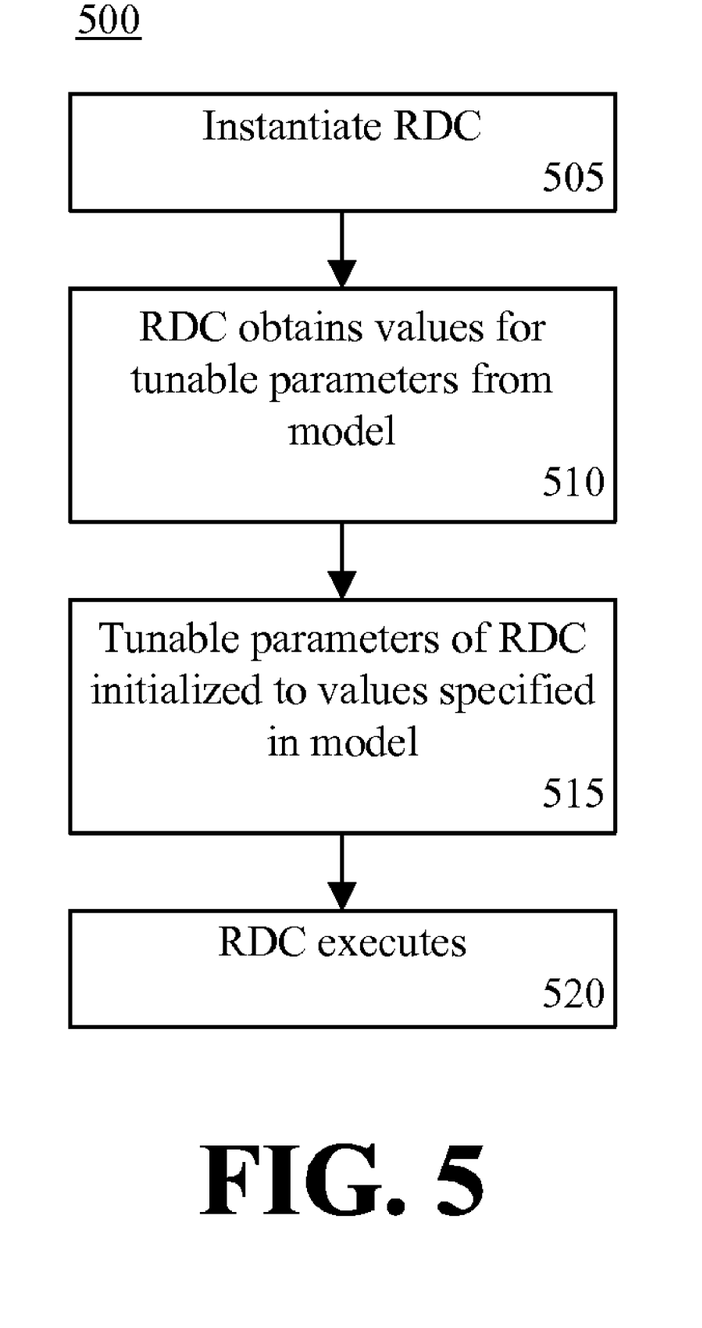
FIG. 5 is a flow chart illustrating a method of tuning reusable software components in accordance with yet another embodiment of the present invention.

FIG. 5 is a flow chart illustrating a method 500 of tuning reusable software components in accordance with yet another embodiment of the present invention. The method 500 can begin in a state where data has been collected and stored within the model as discussed herein. The method 500 illustrates an embodiment in which RDCs can be tuned from the model data.

Accordingly, in step 505, an RDC can be instantiated. In step 510, the RDC can obtain values for the tunable parameters of that RDC. The values can be obtained from the model. In one embodiment, each tunable parameter of the RDC can be initialized in this manner. In another embodiment, only selected tunable parameters of the RDC can be initialized from data stored in the model.

In step 515, the tunable parameters of the RDC can be initialized using values stored in the model. In step 520, the RDC can begin executing with the behavior of the RDC being determined, at least in part, according to the values stored within the tunable parameters of that RDC. The method 500 can be repeated for different RDCs that have been configured to obtain initialization values for tunable parameters from the model.

In another embodiment, the RDCs can be adaptive in nature. For example, the session and attribute listeners can be configured to apply selected statistical processing techniques and continually store updated initialization values for tunable parameters of RDCs. Upon initialization, the RDCs can obtain these values from the model prior to execution so that the speech application is continually and dynamically tuned.

Further, the inventive arrangements can provide a pilot mode where data is collected within the model as discussed. Another mode can be provided which causes RDCs to obtain values for tunable parameters from the model. While in this mode, the listeners can be stopped or paused so that the model does not continually evolve, for example, after acceptable tuning parameters are determined from the pilot mode. In such an embodiment, the RDCs can be tuned from the model, but would be prevented from dynamically adapting as the model data would be locked and not change when in the second mode.

In another embodiment, the RDCs need not be dynamically updated. In that case, after a pilot run of the IVR system, developers can manually reprogram the tunable parameters of the different RDCs used within the speech application using the values stored within the model. In that case, rather than dynamically configuring the RDCs to set the tunable parameters, the developer programs the values based upon data collected in the model. The RDCs then can be released for further pilot runs or as a final product in the field.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. A method of tuning reusable dialog components within a speech application comprising:
    detecting speech recognition events generated from a plurality of speech recognitions, the plurality of speech recognitions performed by a speech recognition engine for a reusable dialog component that does not include any speech recognition engine, the reusable dialog component including a field and a confidence threshold that is associated with the field and specifies a minimally acceptable confidence score for any recognition result provided for the field, the field corresponding to a piece of information for which the speech application is configured to prompt a user, the speech recognition events being generated over a plurality of interactive voice response sessions;
    re-prompting the user for the piece of information if a confidence score associated with a recognition result is below the confidence threshold, the recognition result being generated from a speech recognition performed by the speech recognition engine on a user utterance uttered in response to the speech application prompting the user for the piece of information, the confidence score being generated by the speech recognition engine, being associated with a speech recognition event generated from the speech recognition performed on the user utterance and indicating a confidence in an accuracy of the recognition result; and
    automatically computing a suggested value for the confidence threshold by applying a statistical processing technique to confidence scores associated with a plurality of the speech recognition events, wherein a majority of the confidence scores for the plurality of the speech recognition events fall within a range having a low value and a high value, and wherein automatically computing the suggested value comprises computing a suggested value that is substantially equal to the low value for the range.

2. The method of claim 1, wherein applying the statistical processing technique comprises determining an average of the confidence scores.

3. The method of claim 1, further comprising selecting a particular speech recognition event type to be detected, wherein only speech recognition events of the particular type are used to determine the suggested value.

4. The method of claim 1, further comprising:
    storing the suggested value for the confidence threshold within a model; and
    upon a further execution of the reusable dialog component, the confidence threshold using the suggested value from the model.

5. The method of claim 1, further comprising:
    storing the suggested value for the confidence threshold within a model; and
    providing an interface that facilitates real-time access to the model, wherein the interface facilitates observance of the confidence threshold as the confidence threshold is dynamically updated as operation of the interactive voice response system continues.

6. The method of claim 1, further comprising computing a plurality of suggested values for the confidence threshold as operation of the interactive voice response system continues and storing the plurality of suggested values.

7. The method of claim 1, further comprising counting each instantiation of the reusable dialog component over the plurality of interactive voice response sessions.

8. The method of claim 1, wherein each of the plurality of speech recognitions is performed by at least one speech recognition engine, and wherein the reusable dialog component is a separate component from the at least one speech recognition engine.

9. A system for tuning reusable dialog components within a speech application comprising:
    at least one hardware processor that executes:
        at least one reusable dialog component that includes a field and a confidence threshold that is associated with the field and specifies a minimally acceptable confidence score for any recognition result provided for the field, the field corresponding to a piece of information for which the speech application is configured to prompt a user;
        a listener configured to detect speech recognition events generated during execution of the reusable dialog component, wherein the speech recognition events have a specific type and are associated with the field of the reusable dialog component, and configured to calculate a suggested value for the confidence threshold by applying a statistical processing technique to confidence scores associated with a plurality of the speech recognition events, wherein each of the plurality of speech recognition events comprises a recognition result generated by a speech recognition engine and a confidence score indicating a confidence in an accuracy of the recognition result, wherein a majority of the confidence scores for the plurality of the speech recognition events fall within a range having a low value and a high value, and wherein the listener is configured to calculate the suggested value by computing a suggested value that is substantially equal to the low value for the range; and a model configured to store the suggested value for the confidence threshold, wherein the speech application is configured to re-prompt the user for the piece of information if a confidence score associated with a recognition result is below the confidence threshold, the recognition result being provided by a speech recognition performed on a user utterance uttered in response to the speech application prompting the user for the piece of information, the confidence score being associated with a speech recognition event generated from the speech recognition performed on the user utterance.

10. The system of claim 9, wherein the listener is configured to calculate the suggested value for the confidence threshold using only the speech recognition events that are of a specified type.

11. The system of claim 9, wherein the reusable dialog component, upon execution, initializes the confidence threshold using the suggested value stored in the model.

12. A tangible computer-readable medium, having stored thereon a computer program having a plurality of code sections for tuning reusable dialog components within a speech application, the computer-readable medium comprising:

code for detecting speech recognition events generated from a plurality of speech recognitions, the plurality of speech recognitions performed by a speech recognition engine for a reusable dialog component that does not include any speech recognition engine, the reusable dialog component including a field and a confidence threshold that is associated with the field and specifies a minimally acceptable confidence score for any recognition result provided for the field, the field corresponding to a piece of information for which the speech application is configured to prompt a user, the speech recognition events being generated over a plurality of interactive voice response sessions;

code for re-prompting the user for the piece of information if a confidence score associated with a recognition result is below the confidence threshold, the recognition result being generated from a speech recognition performed by the speech recognition engine on a user utterance uttered in response to the speech application prompting the user for the piece of information, the confidence score being generated by the speech recognition engine, being associated with a speech recognition event generated from the speech recognition performed on the user utterance and indicating a confidence in an accuracy of the recognition result; and code for automatically computing a suggested value for the confidence threshold by applying a statistical processing technique to confidence scores associated with a plurality of the speech recognition events, wherein a majority of the confidence scores for the plurality of speech recognition events fall within a range having a low value and a high value, and wherein automatically computing the suggested value comprises computing a suggested value that is substantially equal to the low value for the range.

13. The tangible computer-readable medium of claim 12, wherein the code for applying the statistical processing technique further comprises code for determining an average of the confidence scores.

14. The tangible computer-readable medium of claim 12, further comprising code for selecting a particular speech recognition event type to be detected, wherein only speech recognition events of the particular type are used to determine the suggested value.

15. The tangible computer-readable medium of claim 12, further comprising:

code for storing the suggested value the confidence threshold within a model; and code for, upon a further execution of the reusable dialog component, initializing the confidence threshold using the suggested values from the model.

16. The tangible computer-readable medium of claim 12, further comprising:

code for storing the suggested value for the confidence threshold within a model; and code for providing an interface that facilitates real-time access to the model, wherein the interface facilitates observance of the confidence threshold as the confidence threshold is dynamically updated as operation of the interactive voice response system continues.

17. The tangible computer-readable medium of claim 12, further comprising code for computing a plurality of suggested values for the confidence threshold as operation of the interactive voice response system continues and for storing the plurality of suggested values.

18. The tangible computer-readable medium of claim 12, further comprising code for counting each instantiation of the reusable dialog component over the plurality of interactive voice response sessions.

* * * * *